United States Patent
Xu et al.

(10) Patent No.: US 9,812,808 B2
(45) Date of Patent: Nov. 7, 2017

(54) MOLDED PRINTED CIRCUIT BOARD

(71) Applicant: PSION, INC., Schaumburg, IL (US)

(72) Inventors: Bo Xu, Mississauga (CA); Yanmin Mao, Brampton (CA)

(73) Assignee: Psion, Inc., Mississauga (CA)

( * ) Notice: Subject to any disclaimer, the term of this patent is extended or adjusted under 35 U.S.C. 154(b) by 283 days.

(21) Appl. No.: 14/022,889

(22) Filed: Sep. 10, 2013

(65) Prior Publication Data

US 2014/0011395 A1    Jan. 9, 2014

Related U.S. Application Data

(62) Division of application No. 12/765,915, filed on Apr. 23, 2010, now Pat. No. 8,555,493.

(51) Int. Cl.
*H01R 13/52* (2006.01)
*B29C 45/14* (2006.01)

(52) U.S. Cl.
CPC ....... *H01R 13/52* (2013.01); *B29C 45/14065* (2013.01); *B29C 45/14639* (2013.01); *Y10T 29/4913* (2015.01); *Y10T 29/49146* (2015.01); *Y10T 29/49158* (2015.01)

(58) Field of Classification Search
CPC .............. H01R 13/52; B29C 45/14065; B29C 45/14639
See application file for complete search history.

(56) References Cited

U.S. PATENT DOCUMENTS

| | | | |
|---|---|---|---|
| 6,128,195 A * | 10/2000 | Weber et al. | 361/737 |
| 6,132,223 A * | 10/2000 | Seeley et al. | 439/76.1 |
| 6,141,221 A * | 10/2000 | Tong et al. | 361/724 |
| 6,180,045 B1 * | 1/2001 | Brandenburg et al. | 264/263 |
| 7,142,433 B2 * | 11/2006 | Lechner | 361/797 |
| 7,347,723 B1 | 3/2008 | Daily | |
| 9,462,746 B1 * | 10/2016 | Gerhardson | A01D 34/006 |
| 2003/0129865 A1 * | 7/2003 | Kato et al. | 439/79 |
| 2006/0127034 A1 * | 6/2006 | Brooking et al. | 386/46 |
| 2006/0171120 A1 * | 8/2006 | Mandel | H05K 5/065 361/704 |
| 2006/0273313 A1 * | 12/2006 | Chen | 257/48 |
| 2008/0072422 A1 * | 3/2008 | Levante et al. | 29/852 |
| 2009/0201029 A1 * | 8/2009 | Asano et al. | 324/555 |

(Continued)

OTHER PUBLICATIONS

Final Office Action dated Jan. 31, 2013, in U.S. Appl. No. 12/765,915, Bo Xu, filed Apr. 23, 2010.

(Continued)

*Primary Examiner* — Hoa C Nguyen
*Assistant Examiner* — Keith Depew

(57) ABSTRACT

Described herein is a molded printed circuit board. The printed circuit board may be placed inside of a mold and a material is injected therein. The material hardens in the mold around the printed circuit board thereby forming an overmolded printed circuit board. The overmolded material may have apertures in it to allow access to the leads on the printed circuit board so that components to be connected to it. The overmolded printed circuit boards may allow a plurality of electrical components to selectively and removably attach to it. Further, the printed circuit board may be attached in a housing which may itself removably and selectively connect to components.

18 Claims, 13 Drawing Sheets

(56) References Cited

U.S. PATENT DOCUMENTS

2009/0284273 A1* 11/2009 Hasegawa .................... 324/754
2009/0289652 A1* 11/2009 Chang ......................... 324/761
2010/0173531 A1*  7/2010 Holste ......................... 439/700
2010/0221960 A1*  9/2010 Chung ...................... 439/733.1
2011/0261543 A1    10/2011 Xu et al.

OTHER PUBLICATIONS

Non Final Office Action dated Aug. 17, 2012, in U.S. Appl. No. 12/765,915, Bo Xu, filed Apr. 23, 2010.
Notice of Allowance dated Jun. 10, 2013, in U.S. Appl. No. 12/765,915, Bo Xu, filed Apr. 23, 2010.
Office Action for Canadian Patent Application No. 2737926 dated Jun. 2, 2016.

* cited by examiner

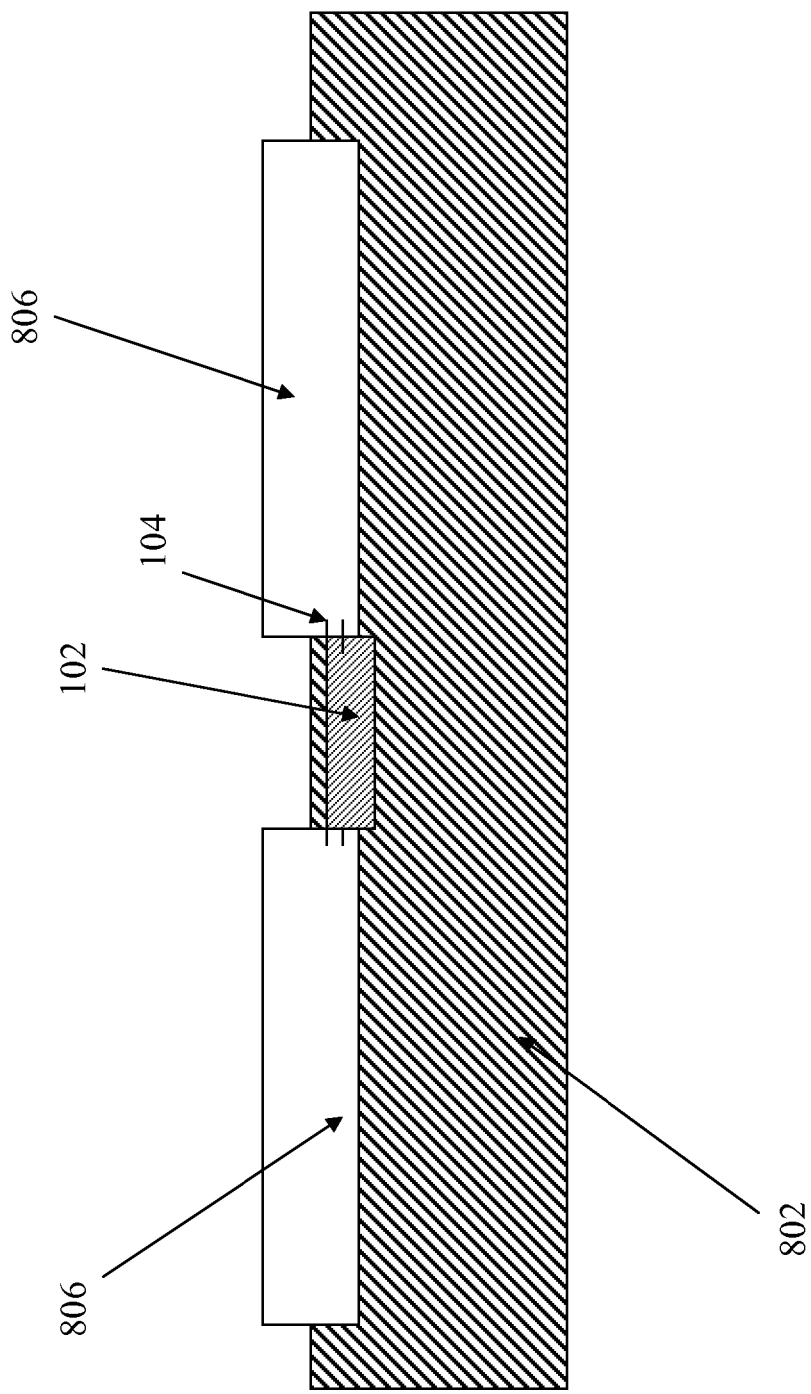

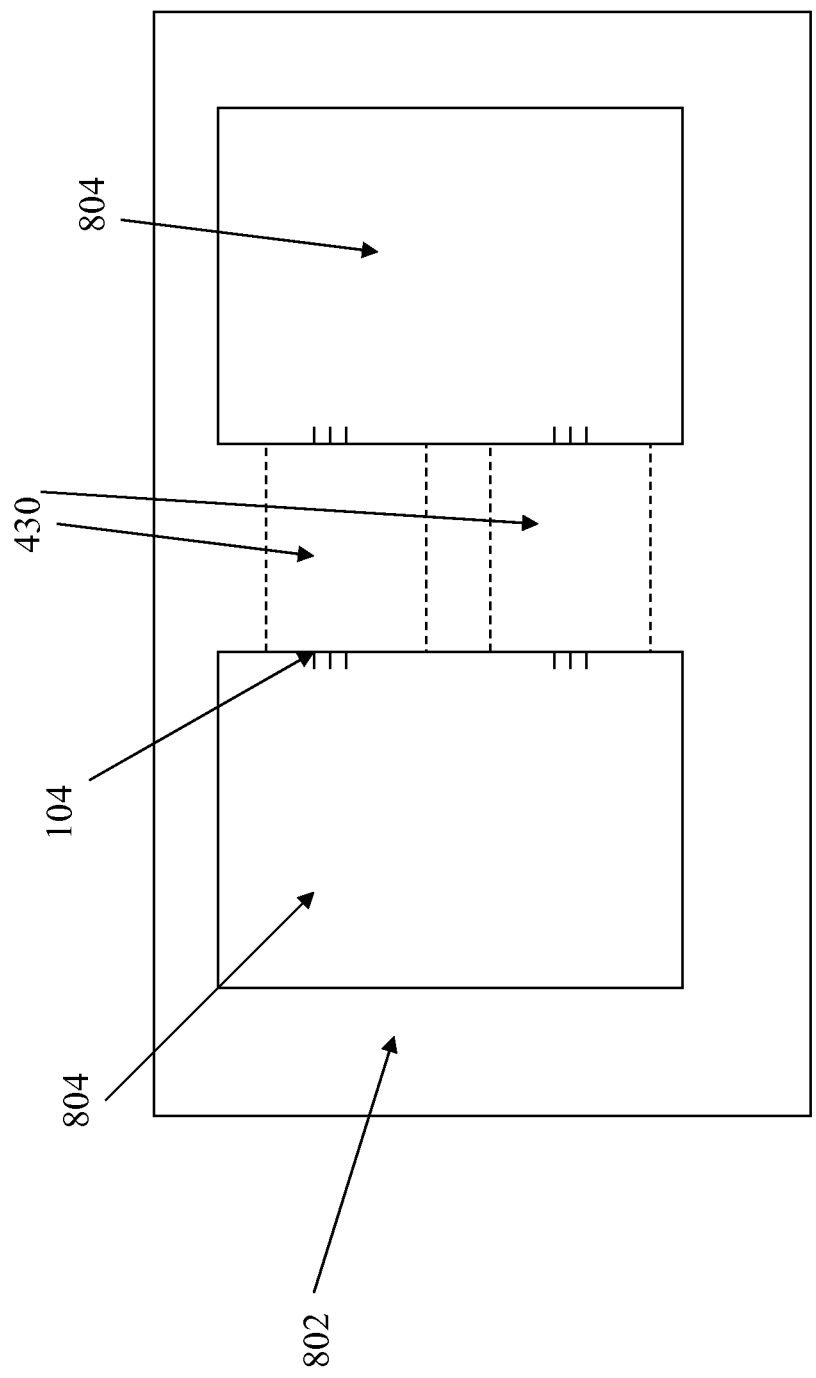

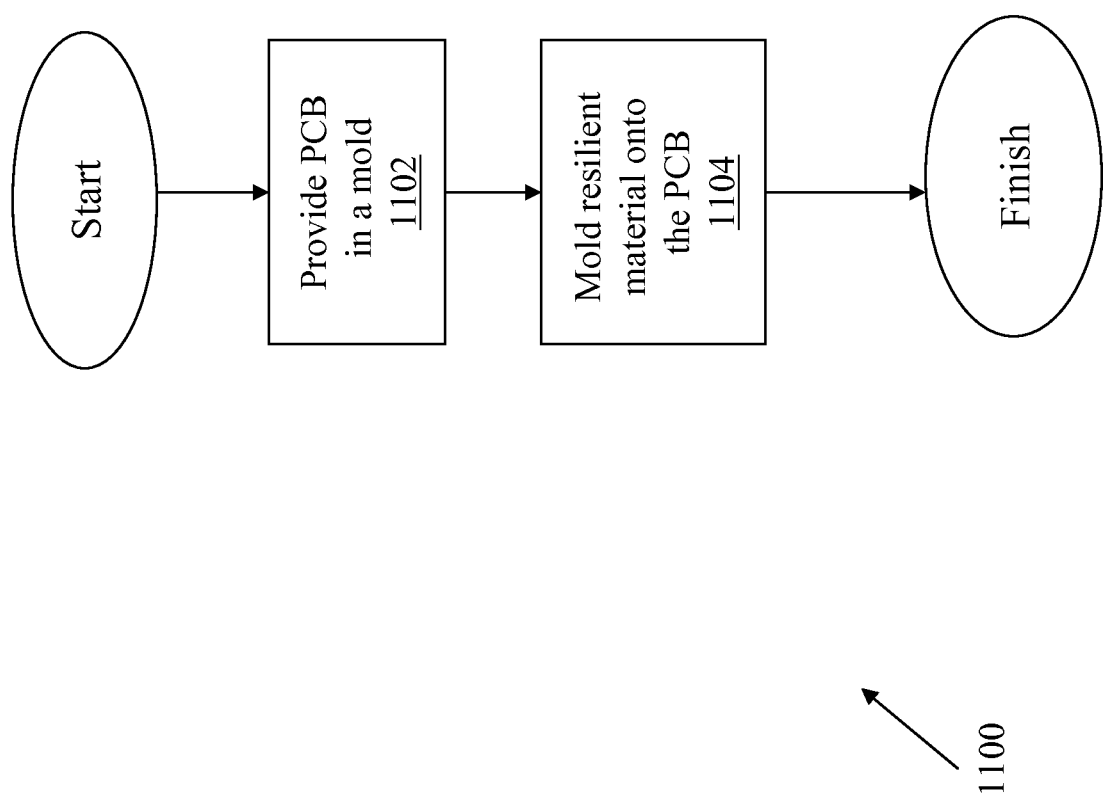

MOLDED PRINTED CIRCUIT BOARD

CROSS REFERENCE TO RELATED APPLICATION

This application is a divisional of U.S. application Ser. No. 12/765,915, filed Apr. 23, 2010, the entire contents of which are incorporated herewith by reference.

FIELD

The present invention relates to printed circuit boards and in particular to printed circuit boards molded in material.

BACKGROUND

Mobile devices are used for a variety of purposes, such as viewing information, scanning information, inputting information, communicating via text or voice, etc. Different mobile devices may use different components for carrying out these purposes. For example, mobile devices may use a screen, a keyboard or other input device, a speaker, a camera, etc. Often different devices are required for some of these different purposes. For example, a mobile scanner used for scanning may be a different device than a cell phone.

Printed circuit boards are commonly attached between different components of a mobile device in order for these different components to function together. For example, a printed circuit board may connect a display screen to a keyboard. If these printed circuit boards come in contact with certain contaminants, such as water or dirt, they may not function properly.

SUMMARY

Printed circuit boards are commonly attached between different components of a mobile device in order for these different components to function together. For example, a printed circuit board may connect a display screen to a keyboard. If these printed circuit boards come in contact with certain contaminants, such as water or dirt, they may not function properly. Accordingly, provided contrary to current manufactured PBCs is a molded connector for connecting a first electronic component to a second electronic component, comprising: a printed circuit board having a plurality of traces such that first ends of the traces are electrically connected to a first connector and second ends of the traces are electronically connected to a second connector, the first connector configured for coupling to the first electronic component, the second connector configured for coupling to the second electronic component; a molded material encasing the printed circuit board for inhibiting exposure of the printed circuit board to contaminants and exposing the first connector and the second connector for facilitating their respective coupling to the first and second electronic connectors.

A first aspect provided is molded connector for connecting a first electronic component to a second electronic component, comprising: a printed circuit board having a plurality of traces such that first ends of the traces are electrically connected to a first connector and second ends of the traces are electronically connected to a second connector, the first connector configured for coupling to the first electronic component, the second connector configured for coupling to the second electronic component; a molded material encasing the printed circuit board for inhibiting exposure of the printed circuit board to contaminants and exposing the first connector and the second connector for facilitating their respective coupling to the first and second electronic connectors.

A second aspect provided is a housing for housing components of a mobile device, comprising: at least two cavities for receiving a respective first electrical component and second electrical component; a printed circuit board having a plurality of traces such that first ends of the traces are electrically connected to a first connector and second ends of the traces are electronically connected to a second connector, the first connector configured for coupling to the first electrical component, the second connector configured for coupling to the second electrical component; a molded material forming the housing, the molded material encasing the printed circuit board for inhibiting exposure of the printed circuit board to contaminants and exposing the first connector and the second connector for facilitating their respective coupling to the first and second electronic connectors.

A further aspect provided is a method of manufacturing a molded printed circuit board, comprising the steps of: providing a printed circuit board in a mold, the printed circuit board having an exterior surface with a plurality of leads thereon, each lead having an electrical contact to form a connector for connecting to an electrical component; and molding resilient material in the mold onto the printed circuit board to form a resilient material portion on the external surface of the printed circuit board, the resilient material portion defining apertures around the electrical contacts of the leads for allowing access to the electrical contacts from the exterior of the external surface.

BRIEF DESCRIPTION OF THE DRAWINGS

A detailed description of the invention is set out below with reference to the accompanying illustrations in which

FIG. 8A is a cut out side elevation view of a printed circuit board inside a housing holding modular components;

FIG. 9 is a top plan view of a housing containing two printed circuit boards;

DETAILED DESCRIPTION

Figure 6:
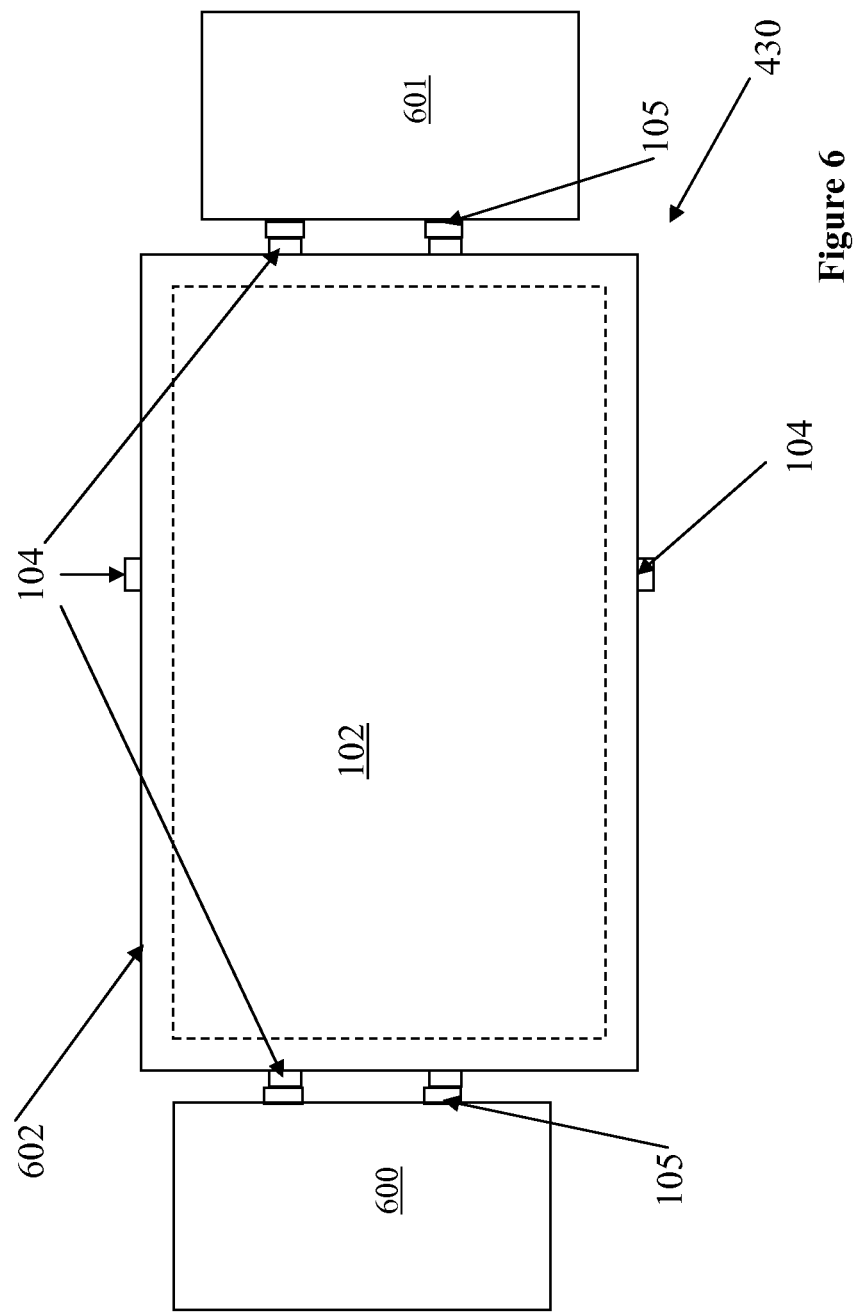
FIG. 6 is a top plan view showing a molded printed circuit board.

Referring to FIG. 6, is a molded connector 430 for connecting a first electronic component 600 to a second electronic component 601. The molded connector 430 comprises a printed circuit board (PCB) 102. The PCB 102 has a plurality of traces 106 (see FIG. 1) such that first ends of the traces 106 are electrically connected to a first connector 104 and second ends of the traces 106 are electronically connected to a second connector 104, the first connector 104 configured for coupling to the first electronic component 600, the second connector 104 configured for coupling to the second electronic component 601. A material 602 is molded over or onto the PCB 102 such that the molded material 602 encases the PCB 102 in order to inhibit exposure of the PCB 102 to contaminants while exposing the first connector 104 and the second connector 104 for facilitating their respective coupling to the first and second electronic components 600,601. Example contaminants may include liquid, dirt, etc.

Accordingly, it is recognised that the material 602 is an integral material that is quite different from standard known in the art procedures of applying two halves of a housing together via use of an interposed sealing element at the mating surfaces of the two halves, in order to house components within an enclosure formed by mating the two halves (i.e. a clamshell design). Problems with use of two halves include the requirement of an additional seal as well as more complicated assembly procedures that is undesirable. One advantage of the molded material 602 is that sealing about the substrate 101, traces 106, and attached connectors 104 is simplified, especially around the complex exterior shape of the substrate 101, traces 106, and connectors 104 combination. It is recognised that sealing by use of a gasket around complex shapes can be imperfect as well as less durable than around regular shapes (e.g. simple standard shapes such as boxes, spheres, etc.).

The material 602 may be a hard plastic material that is molded over the PCB 102. Alternatively, the material 602 may be a resilient material in which case the material 602 is molded over the PCB 102 using an overmolding process. Thus, the present connector 430 may be implemented using at least either a PCB 102 molded with hard plastic 602, a PCB 102 overmolded with resilient material 602, or other techniques for encasing an object in material 602.

Printed Circuit Boards 102

Figure 1:
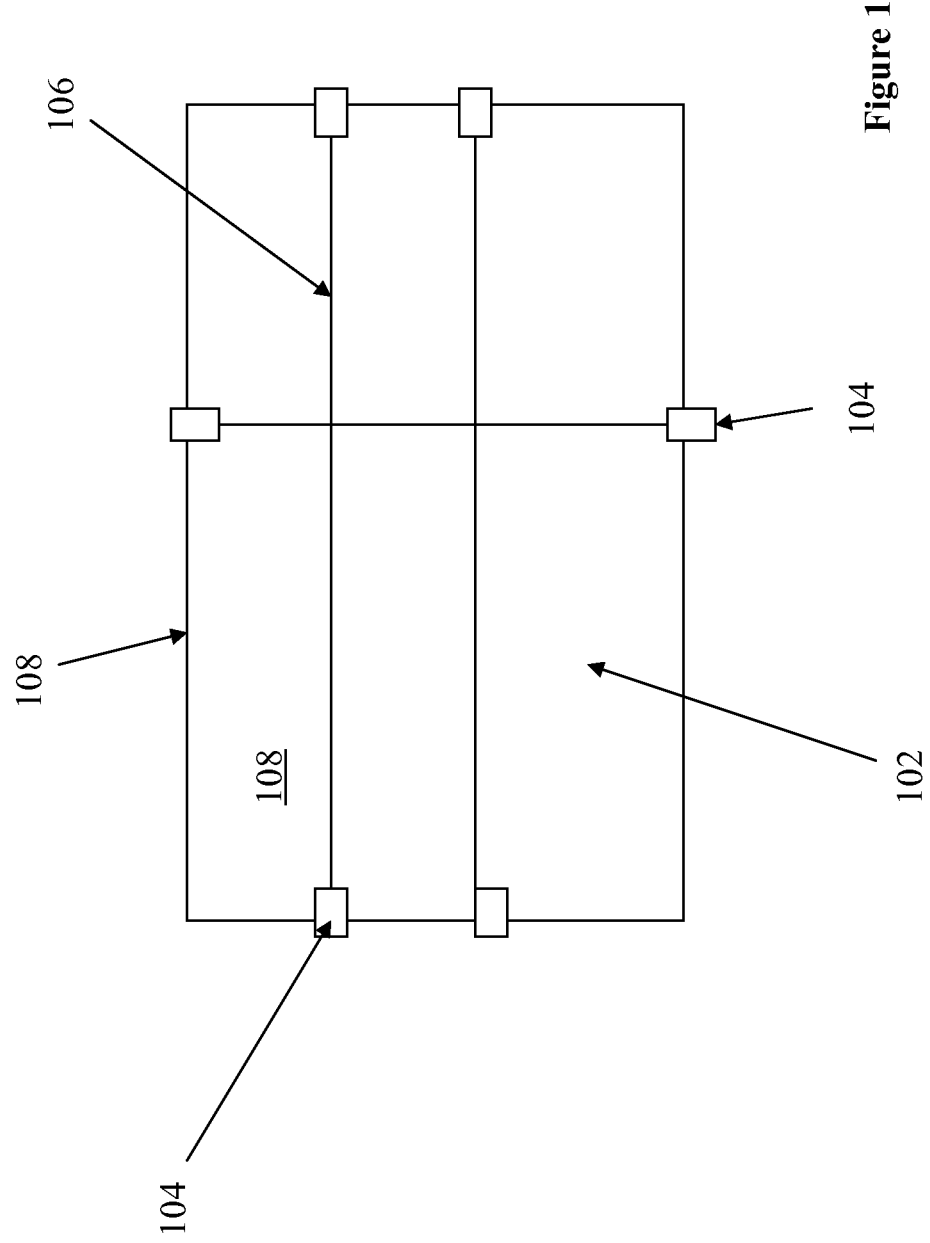
FIG. 1 is a block diagram of a printed circuit board.

An example printed circuit board 102 is shown in FIG. 1. PCBs can be used to support and electrically connect electronic components 600,601 using conductive pathways, tracks, or traces 106, for example etched from copper sheets laminated onto a non-conductive substrate 101 (e.g. fibreglass or other non-conductive/electrically isolative material. A PCB 102 may also be populated with electronic components (not shown) connected to the traces 106 to form a printed circuit assembly or PCB assembly.

PCBs 102 may be made by bonding a layer of copper over the entire substrate 101 and then removing the unwanted copper after applying a temporary mask, leaving only the desired copper traces 106. The substrate 101 is an electrically nonconductive material, such as plastic. This may be done, for example, by etching the copper layer. Alternatively, PCBs 102 may be made by adding traces 106 to the bare substrate 101.

The PCBs 102 also have connectors 104, which act as conductive elements for connecting the PCB 102 to another electronic device 600,601 external to the PCB 102. The connectors 104 have electrical contacts for coupling with mating connectors/contacts 105 of the external electronic device 600,601. The PCB 102 may be of rectangular shape with the connectors 104 at the surface 108 of the PCB 102. However, the connectors 104 may be on another portion of the PCB 102. Further, the PCB 102 can be a different shape then rectangular, such as circular, triangular or other non-symmetrical shape. The PCBs 102 may be multi-layer PCBs 102, formed by bonding together separately etched thin boards. A PCB 102 may also be referred to as a printed wiring board or etched wiring board.

Pogo™ Pins

Figure 2:
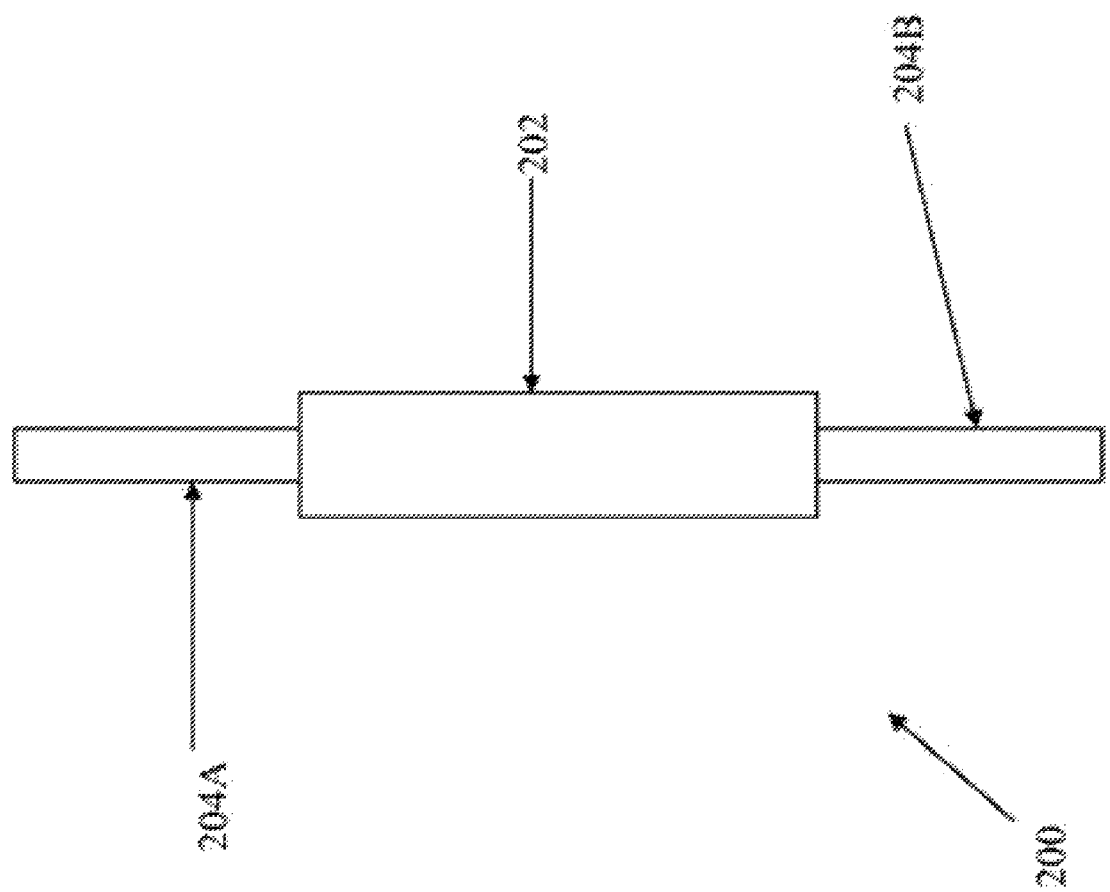
FIG. 2 is a block diagram of a pogo pin.

Referring to FIG. 2, Pogo pins 200, as one example of electrical connector 104, are devices used in electronics for electrically connecting two electronic components (e.g. PCBs 102 to the device 600,601). The connection made by a pogo pin 200 between two components may, for example, be a temporary connection. Pogo pins 200 may also be used to establish permanent electrical connections between components or within a computer.

A pogo pin 200 can comprise a body, such as a cylinder 202, surrounding two opposing spring-loaded pins 204A, 204B. The pins 204A, 204B may be biased outwardly from the cylinder 202 by the springs. When a pogo pin 200 is pressed between two electronic circuits, the pins 204A, 204B are pressed inwards towards the cylinder 202 against the biasing of the springs so as to make a secure electrical contact between the pin 204A, 204B and the electronic components (e.g. PCBs 102). It is recognized that the body need not be of cylindrical shape and can instead be rectangular or non-symmetrical in cross section.

The pins 204A, 204B are made from a hard material and may be plated with a substance (such as gold) that provides a reliable contact. The pins 204A, 204B typically provide an electrical contact with the body (e.g. the cylinder 202) so that the spring does not have to be relied on to carry the electrical signal between components connected by the pogo pin 200.

For example, the pogo pins 200 may be permanently electrically connected at one end (i.e. at the end of one pin 204A) to the end of the trace 106 electrical component, thus forming the connector 104. Another electrical component 600,601 external to the PCB 102 can then be removably attached using that pogo pin 200 connector 104. Accordingly, in an alternative embodiment, the pogo pins 200 can also include a spring loaded pin 204A,B in a cylinder 202 which is soldered or otherwise fixedly electrically connected to the end of the trace 106 of the PCB 102 to form the connector 104.

Docking Stations 300

Figure 3:
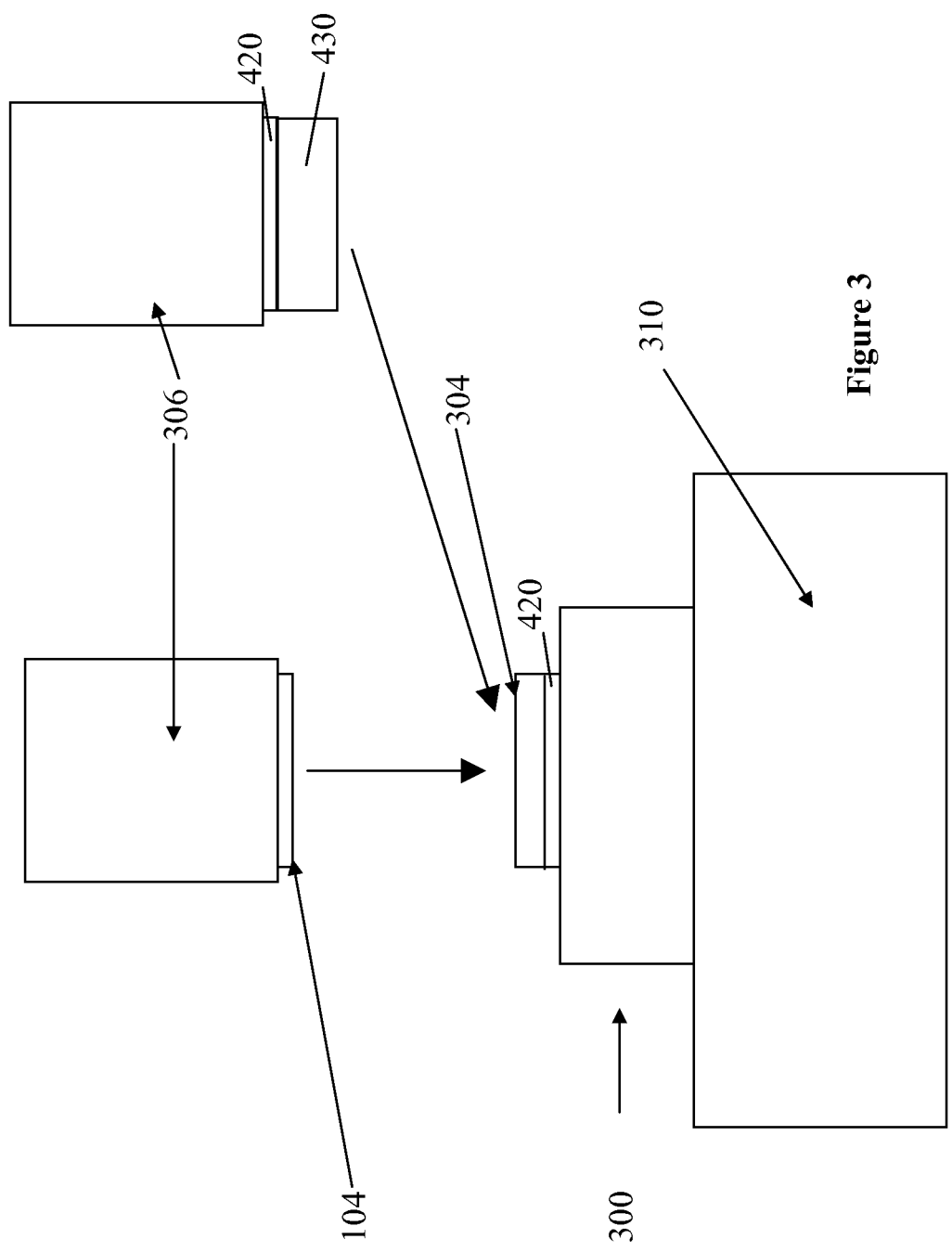
FIG. 3 is a block diagram of a docking station and a mobile device.

Referring to FIG. 3, a docking station 300 is used for electronically connecting devices 306 such as mobile devices including laptops, cell phones, smart phones, wireless mouses, etc., to other devices 310, including desktop computers via common peripherals. Use of a docking station 300 can, for example, allow a device 306 (e.g. a mobile device) to recharge by obtaining power through the docking station 300 from the grid or from another electronic device 310 such as a desktop computer. Further, besides charging, the docking devices 300 could also be used for electronic information exchange, instead of power the information signal is passed through.

A docking station 300 has a receiver 304 for connecting to an electronic device 306 via a connector 104, so as to allow electricity to flow therethrough. The docking station 300 may also be connected to a desktop computer or other peripheral device 310 (including a wall socket or other power source) so as to electronically connect to the electronic device 306 that is received in the docking station 300.

Because a wide range of dockable devices 306 have different connectors, power charge rates, and uses, docking stations 300 are not standardized and are therefore often designed for use with a specific make and model of a device 306.

Molding

Overmolding is any molding process where one or more materials, such as molten plastics or polymers/elastomers, are molded onto a substrate 101 to produce a single part. A rigid (e.g. plastic) substrate body 101 can be combined with a resilient or rubber-like elastomer as the molded material 602 (e.g. overmold material) applied to the underlying substrate 101. The substrate body 101 can, alternatively, be made of a material other than plastic. The elastomer material 602 may be a thermoplastic elastomer which may be molded on top of the substrate body 101, for example. Overmolding allows these two or more different materials 101, 602 to be combined into one part 430 to improve appearance or durability. The substrate body 101 is first produced, and then the resilient material 602 is molded onto the substrate body 101 (i.e. including the traces 106 as a PCB 102).

Insert molding is one type of a molding process. Insert molding involves first placing one or more substrate bodies (e.g. substrate 101 with traces 106 as a PCB 102) in a mold, either by hand or automatically; second, a molten polymer 602 (which hardens upon curing/cooling as a resilient material) is injected into the cavity of the same mold. When the polymer 602 is hardened over the PCB 102, the molding is complete to form the molded PCB connector 430.

Multi-shot molding is another form of molding. In the multi-shot molding process, multiple injection units are each independently used to inject molten polymer into mold in order to form a multi-component assembly.

During the molding process the molded part (i.e. the injected molten polymer(s), which later hardens) is often bonded to the substrate body. This bond may be a chemical adhesion between compatible polymers or a mechanical interference/interlocking mechanism, for example. If the insert molding process is used, a chemical adhesive can be applied to the inserted substrate body prior to the inserting the substrate body into the mold and/or prior to the injection of the molten polymer.

It is recognised that the molding process can result in the injected molten material 602 becoming bonded to the underlying substrate 101 e.g. due to partial melting of the underlying substrate 101 by the heat contained in the molten polymeric/elastomeric material 602, and/or due to the use of an intermediate adhesive material (not shown) applied to the substrate 101 to facilitate bonding of the polymeric/elastomeric material 602 to the underlying substrate 101 and/or adhesive material applied to the connectors 104 to facilitate bonding of the material 602 to the connectors 104 themselves. It is also recognised that the molding process can result in the injected molten material 602 not becoming bonded to the underlying substrate and/or the connectors 104, i.e. the substrate 101 and the hardened/cured resilient material 602 can be moved relative to one another at their material interface (i.e. the interface surface between the hardened/cured resilient material 602 and the underlying substrate 1011), or otherwise mechanically removed from the PCB 102 without damaging of the substrate 101 and/or trace 106 materials.

The Molded Printed Circuit Board 430

Figure 4:
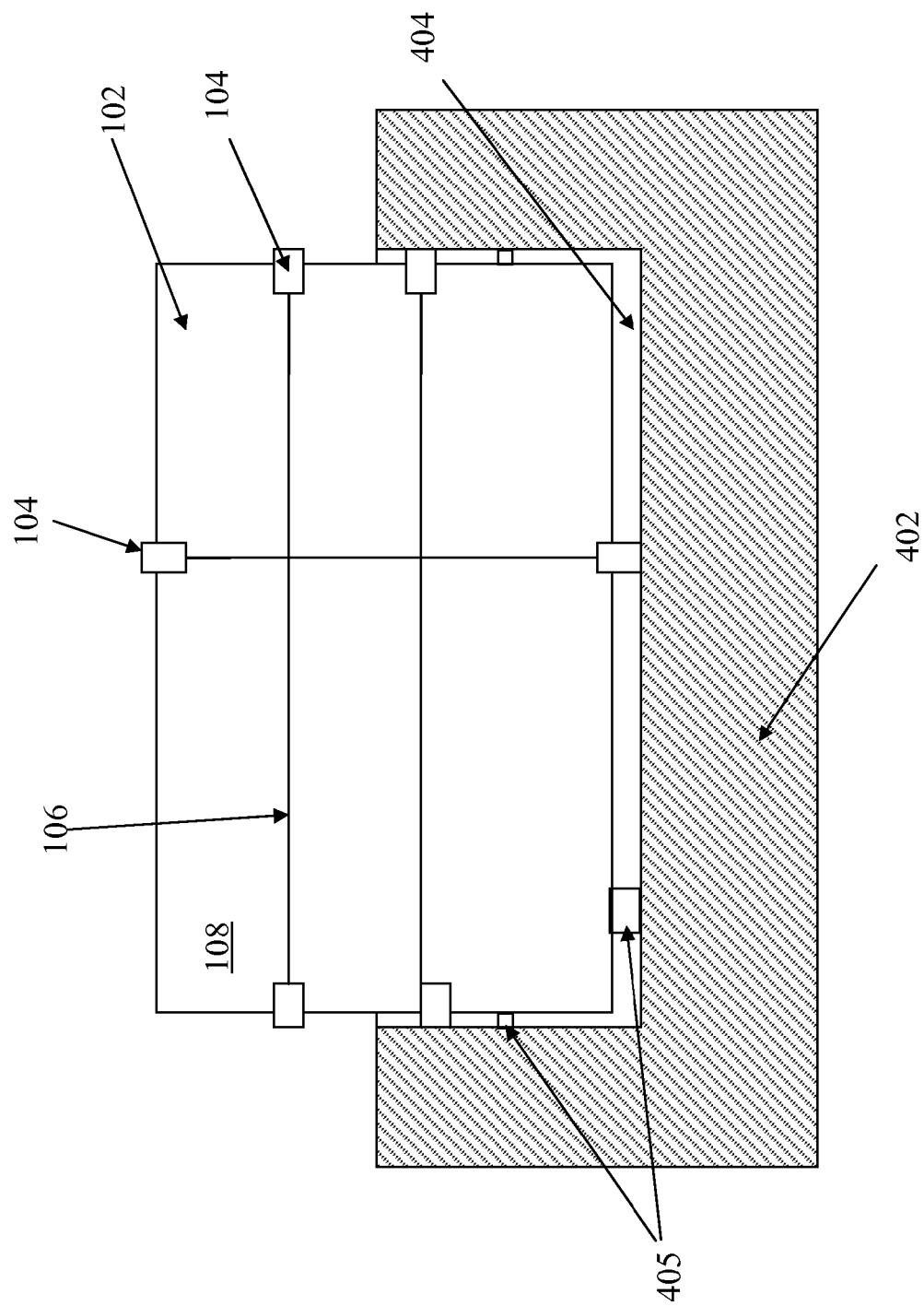
FIG. 4 is a cut out view showing a printed circuit board inside of a portion of a mold.

FIG. 4 shows the PCB 102 in a portion of a mold 402. The mold 402 is shaped so as to provide a cavity 404 between the external surfaces 108 of the PCB 102 and the mold 402. The electrical connectors 104, which are on a surface at the end of each trace 106 may abut the mold 402 or are otherwise not in the cavity 404, such that application of the material 602 will not completely encase the connectors 104 and the substrate 101 and leads 106, rather, at least a portion of the connectors 104 remains exposed while the substrate 101 and traces 104 are encased.

Figure 5:
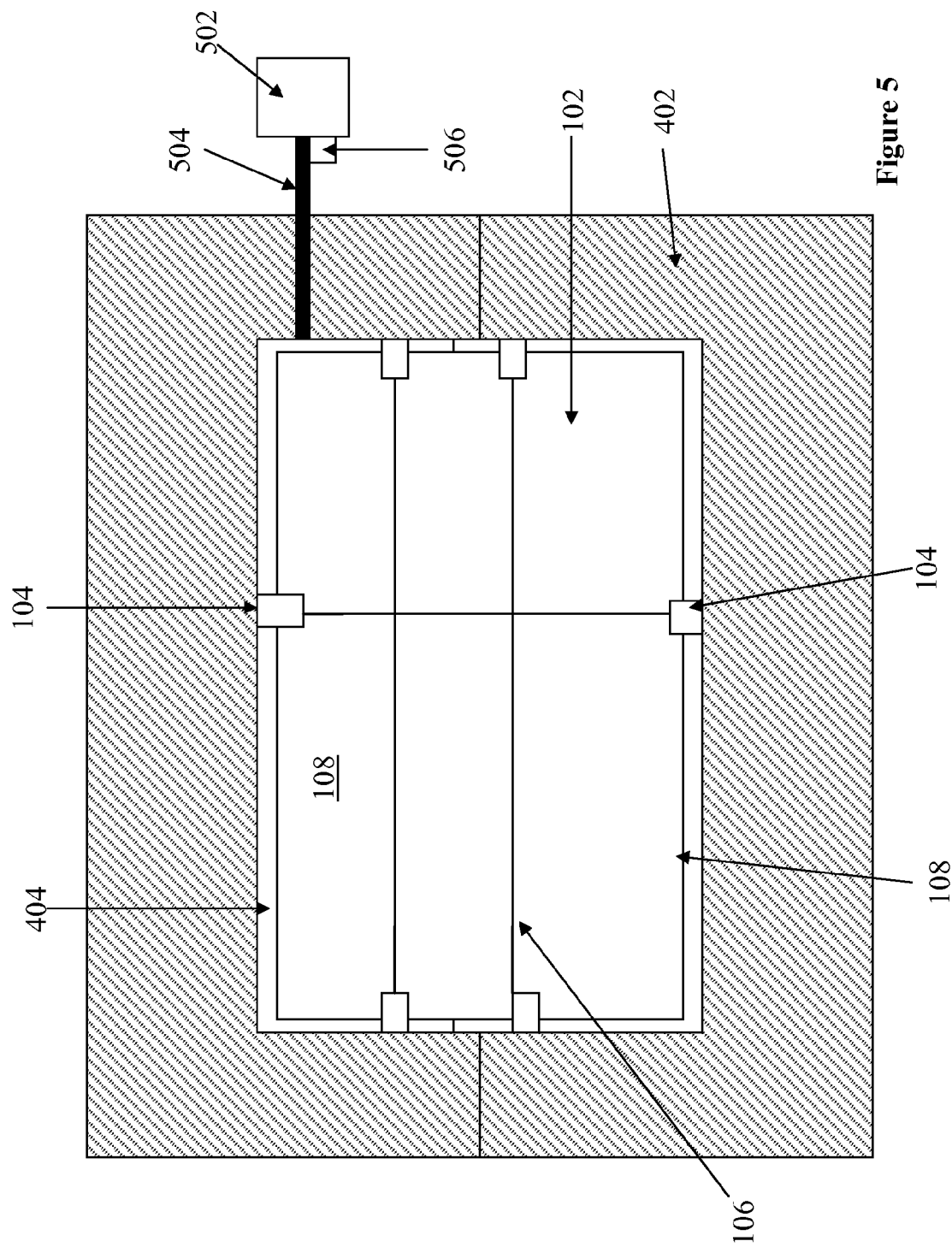
FIG. 5 is a cut out view showing a printed circuit board inside a mold.

FIG. 5 shows a cut-out of a mold 402 enclosing a PCB 102. The PCB 102 is entirely encased in the mold 402. The cavity 404 between the mold 402 and the PCB 102 extends around the surface 108 of the PCB 102. However, the electrical connectors 104 may abut the mold 402. Further, a series of pins 405 coming out from the mould 402 to support the PCB 102 so that the PCB movement during injection is inhibited. The result of using these pins 405 is there will be openings left by these pins 405 on the final part 430 that can be filled/sealed using appropriate sealing compound (e.g. epoxy) to provide for the sealing of the PCB 102 by the material 602 to form the moulded connector 430.

The molds 402 may be used in an overmolding process for overmolding resilient material 602 onto the PCB 102. Alternatively, the molds 402 may be used for a molding process whereby a hard plastic 602 is molded over the PCB 102. There may be an injector 502 attached to a passage 504 (e.g. a tube). The injector 502 contains the resilient material 602 to be injected into the cavity 404 between the molds 402 and the PCB 102. The material 602 may be other polymer pellets or another resilient material 602 suitable for injection molding. There may be a heat source 506 connected to either or both of the passage 504 and the injector 502. The heat source 506 applies heat to the resilient material 602 when it is in the injector and/or in the passage 504. Upon application of the heat from the heat source 506, the injection material 602 becomes molten or in a fluid state. The passage 504 fluidly connects the injector 502 to the cavity 404 so that the molten or fluid injection material 602 can be injected from the injector 502 through the passage 504 into the cavity 404.

The molten material (e.g. plastic or polymer) 602 is injected into the cavity 404 so as to completely fill the cavity 404, thus encasing the substrate 101 and traces 106 and at least a portion of the connectors 104, while at the same time leaving the remaining portion of the connectors 104 exposed for facilitating contact with the connectors 105 of the external electronic devices 600,601 (see FIG. 6). The mold 402 remains in place until the injected material 602 has hardened. The molds 402 may then be removed revealing the molded PCB 430 (see FIG. 6). In an example injection process, normally the tool (molds 402) opens and the part-overmolded PCB connector 430 is ejected from the tooling.

The material 602 is molded over the PCB 102 for inhibiting exposure of the PCB 102 to contaminants such as dirt, dust or liquid. The material 602 may be bonded (e.g. chemically or mechanically) to the surface of the PCB 102. Alternatively, an adhesive may be used to bond the material 602 to the surface of the PCB 102. The material 602 may thereby be permanently molded over the PCB 102 to form the molded PCB 600. The material 602 molded onto the PCB 102 may be removed only by damaging the integrity of the molded material 602. For example, if it is removed from the PCB 102 the molded material 602 may be cracked or broken. Thus, the molded material 602 is permanently molded as attached to or adhered to the PCB 102.

Further, the molded material 602 may encase or enclose the PCB 102. What is meant by encasement or enclosement in this context is that the molded material 602 forms a single piece of material (e.g. resilient or hardened) that envelopes the surface of the PCB 102 and portions of the connectors and covers the surface of the PCB 102 (i.e. substrate 101 and traces 106).

However, the molded material 602 does expose at least a first connector 104 and a second connector 104 so that an electrical connection can be made between a first electrical component 600,601 and the first connector 104 and a second electrical component 600,601 and the second connector 104. For example, the contacts 104 may abut the mold 402 during the molding process so that when the material 602 is molded onto the surface of the PCB 112, the hardened material covers the entire PCB 102 with the exception of the contact 104 which are exposed. Other methods of allowing the connections (e.g. connectors 104) to be accessible through the overmolded material may be familiar to a person of ordinary skill in the art.

An electrical component 600,601 may be attached to the molded PCB 430 by connecting an electrical contact 105 of the electrical component to an electrical contact 104 of the molded PCB connector 430. This connection may be a removable connection. For example, pogo pins 200 may be used to connect the electrical contact 104 of the overmolded PCB connector 430 to an electrical contact 105 of an external component 600,601. By way of further alternative, the electrical contact 104 may be a socket or further pin extending from the PCB connector 430. If the electrical contact 104 is a socket the exposure in the molded material 602 may be an aperture allowing a pin (e.g. connector 105) from the electrical component 600,601 to connect to or mate with the socket 104.

The connectors 104 are one type of connector that can be used in a PCB 102, for example. Further, the PCB 102 may have a first connector 104, a second connector 104 or a plurality of connectors 104.

In a further embodiment, the molded PCB 430 may be attached at its first connector 104 to the docking station 300 thus forming the receiver 304 on the docking station 300. This receiver 304 may allow electricity to flow between the molded PCB 430 (and/or any electronic components connected thereto) and another device 310 attached to the docking station 300, such as a desktop computer. A seal 420 on/adjacent to the molded PCB 430 abuts the receiver 304 or docking station 300 so as to prevent fluid, dirt or other contaminants from interfering with the electrical connection between the molded PCB 430 and the docking station 300. Alternatively, the sealing 420 is between the terminal 306 and docking connector 430, such that the molded connector 430 is attached to one end of the terminal 306. The sealing 420 can be achieved by foam gasket, not the overmold material, but it could be in a special design.

By way of further example, this connection between the molded PCB 430 and the terminal 306 may be a permanent connection. Further, this permanent connection may also be molded with resilient material thereby forming a seal between the terminal 306 and the molded PCB 430. For example (not shown), the docking station 300 together with the PCB 102 may be placed into the mold 402 so that the resilient material may be molded around the connection between the docking station 300 and the PCB connector 430 (operating as the receiver 304). A molded sealed connection is formed between the PCB connector 430 and the docking station 300.

Yet a further example may be connecting a PCB 430 between two electrical components of a device (such as a mobile device) and molding both connections 104 as well as the PCB 102. For example, a PCB 102 may be connected at a first connector (e.g. a connector 104) at one end to a first component of a mobile device (e.g. a display screen) and at a second connector (e.g. another connector 104) at the opposite end of the PCB 102 to a second component of the mobile device (e.g. a keyboard input). This PCB 102 as well as the two connections may be overmolded with resilient material 602 so as to form a complete enclosure of the PCB 102 and the two connections 104 with the devices permanently connected together via the molded connector 430. This molded resilient material thereby forms a first seal between the first connector and the first component and a second seal between the second connector and second component.

In a further embodiment, the molded PCB 430 has a plurality of connectors 104 for removably connecting to various external components. For example, a molded PCB 430 may be attached at a first connector to a docking station 300, as described above, and may have a plurality of connectors 104, opposite the first connector and docking station 300 for connecting to external components. The external components that are connected to the molded PCB 430 may then be electrically connected to the docking station 300 and any further components attached to the docking stations, such as a desktop computer 310. The molded PCB 600 may have a plurality of electrical contacts 104 or connectors at each end so that one or more components may be connected at each end.

It is recognized that the PCB 102 can be coated in hard plastic 602 instead of being molded in resilient material and although the present description refers to molded PCB 430 similar features may be implemented using a PCB 102 coated in hard plastic 602 instead. The hard plastic coating 602 may be attached over the PCB 102 by an injection mold, for example.

Figure 7:
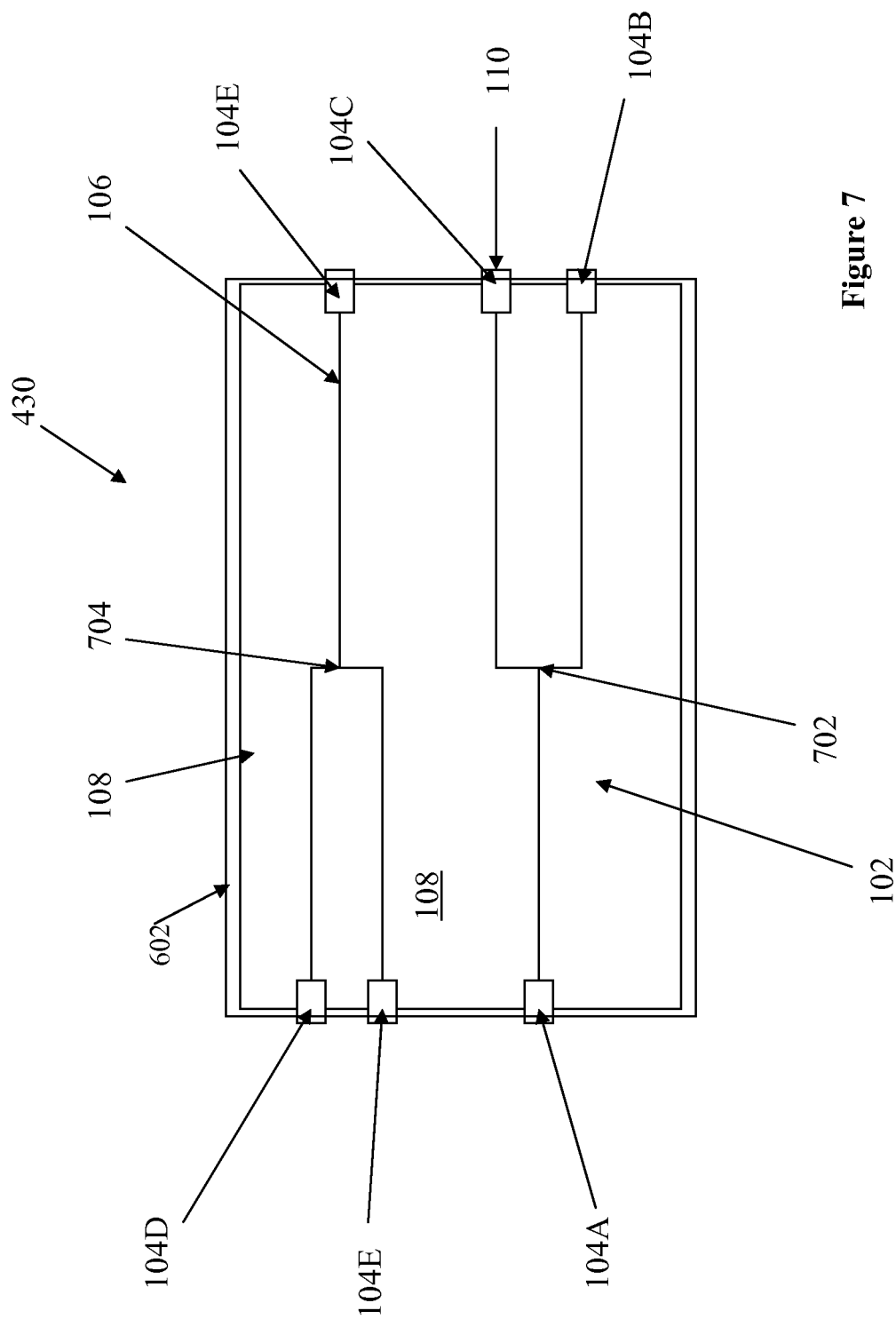
FIG. 7 is a top plan view of a printed circuit board showing one to many and many to one tracing.

Referring to FIG. 7, a PCB 102 may have one-to-many or many-to-one tracing. An example of one-to-many tracing 106 may be described as follows. Electrical power is input into a connector 104A from where it is routed along the tracing 106 of the PCB 102 and output from at least two connectors 104B, 104C. The tracing 106 is split from a line to at least two at a juncture 702. Similarly, an example of many-to-one tracing may be described as follows. The electrical power is input into at least two connectors 104D, 104E and travels along two lines of tracing 106 to a juncture 704. At the juncture 704 the tracing 106 becomes a reduced number of lines (e.g. one) from where the electrical power is output from the reduced number of lines (e.g. a single connector 104F). What has been described is one-to-two and two-to-one routing, however a skilled person would be able to extrapolate the same reasoning to one-to-three routing, one-to-four routing, etc. and three-to-one routing, four-to-one routing, etc. without difficulty.

Using the one-to-many routing, for example, a single component 600 can be connected to one side of the PCB 430 (e.g. the input side of the PCB 430) and many components can be connected to another side of the PCB 430 (e.g. the output side of the PCB 430) so that the one component can operate with or communicate with each of the many components.

Using the many-to-one routing, for example, a many components can be connected to one side of the PCB 430 (e.g. the input side of the PCB 430) and one component can be connected to another side of the PCB 430 (e.g. the output side of the PCB 430). Using many-to-one routing allows each of (or collectively, all of) the many components to operate or communicate with the one component.

In a further embodiment, the PCB 430 may have a many-to-many routing whereby a plurality of first components connect to the PCB 430 so as to be routed to a plurality of second components connected to the PCB 430.

PCB in a Housing

Figure 8:
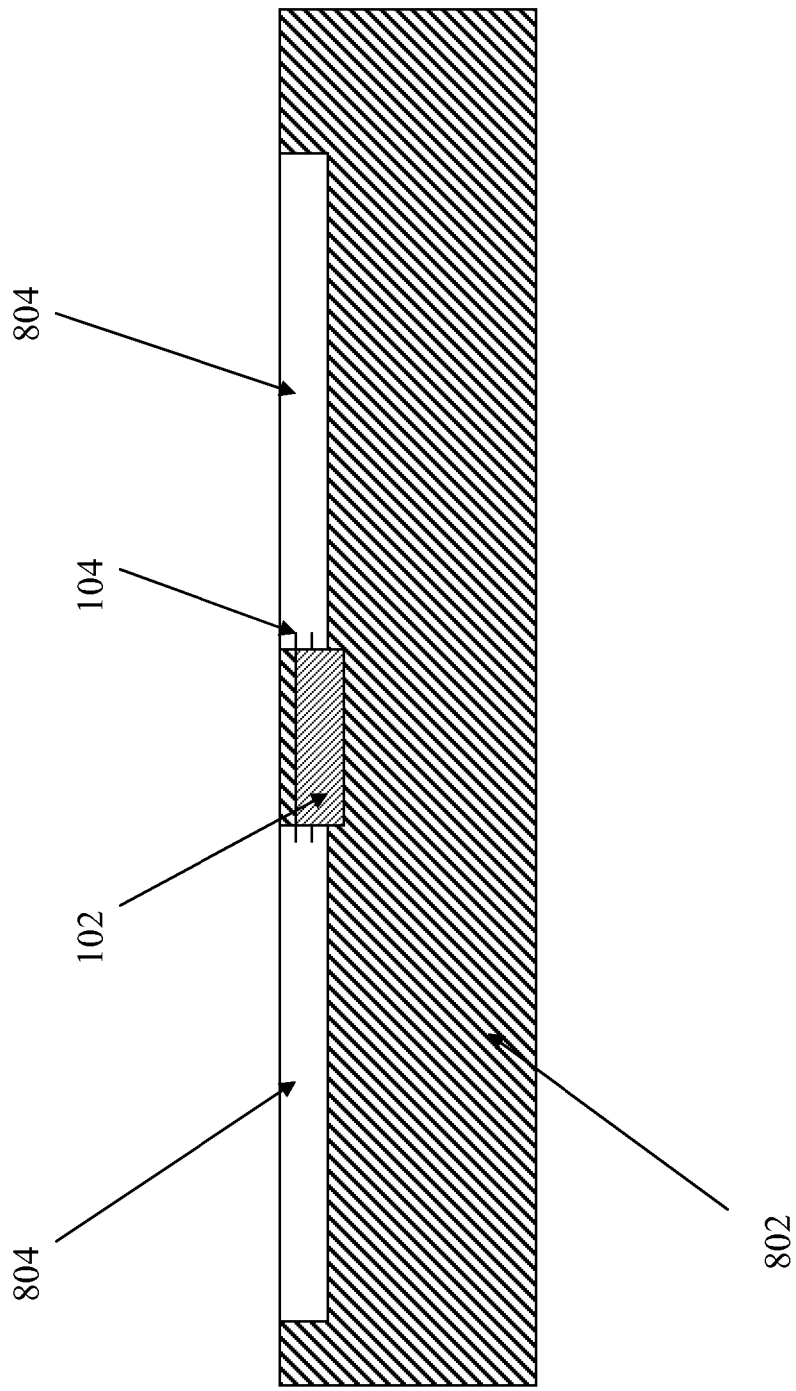
FIG. 8 is a cut out side elevation view of a printed circuit board inside a housing for modular components.

Another aspect of the present invention is shown in FIGS. 8, 8A and 9. In this aspect, the PCB 102 is molded into a housing 802 where it is used to selectively connect to components 806 mounted in enclosures 804. The components 806 may be components of a mobile device and the housing 802 that of the mobile device. For example, components 806 may include a display screen, a scanner, an input device (e.g. keyboard), a speaker, etc. The housing 802 with removable components thereby become a modular mobile device. The PCB 102 assists in adapting the housing 802 to connect to a variety of components 806.

The housing 802 is used for holding components 806 of a device. Components 806 may include, for example a keyboard or other input device, a display screen, a scanner, or other components 806 of a device that are familiar to a skilled person.

The housing 802 may have two cavities 804 in which the components 806 are removably attached. In the embodiment shown in the Figures, there are two such cavities 804 in the housing 802. The present invention is not, however, restricted to a housing 802 with two cavities 804. For example, the housing 802 may have three or four cavities 804. Further, the housing 802 may only have one cavity 804 for housing a component 806 and any additional components 806 may be permanently attached to or in the housing 802.

The PCB 102 is molded or encased in the housing 802, such that the housing becomes the encasing material 602 (see FIG. 6) for forming the molded PCB connector 430 as part of the housing 802. The PCB 102 may itself be a molded PCB 430 that is further molded into the housing 802. Further, the PCB 102 may be directly molded in or on or otherwise secured to the housing 802.

The PCB 102 may be located in or on the housing 802 between two cavities 804. Connectors 104 on opposite ends of the PCB 102 may be accessible from the cavities 804 on opposite sides of the PCB 102. A seal 420 (see FIGS. 4-6 for example) may also circumnavigate the connectors 104. It is recognized that the connectors 104 need not be on opposite ends of the PCB 102. However, in embodiments in which there are more than one cavities 804 in the housing 802, it is preferably that at least one connector 104 from the PCB 102 is accessible from a first cavity 804 of the housing 802 and that at least one connector 104 from the PCB 102 is accessible from a second cavity 804 of the housing 802.

Components 806 may be attached into each cavity 804 so that the conneceters 104 of the PCB 102 attach to electronic connectors (not shown) on the components 806. Further, when connected (FIG. 8A) the seal 420 around the connectors 104 abuts the component 806 thereby forming a seal around the connection between the PCB 430 (i.e. in or on the housing 802) and the component 806. The seal 420 can thereby prevents liquid, dirt or other contaminants from interfering with the connection between the PCB 102 and the component 806 in the cavity 804.

The components 806 may, for example, be removably attached in the cavity 804 by a snap fit. The snap fit may be accomplished by having a bevelled edge (not shown) circumnavigating the cavity 804. Other friction fits or methods of attaching a component 806 in a cavity 804 which are familiar to those skilled in the art can be used in the present invention.

There may be more than one PCB 102 molded into or encased into the housing 802, as shown in FIG. 9. The PCBs 102 in FIG. 9 are show in dashed lines indicating that the PCBs 102 may be molded into (and encased in) the housing 802 material, such that at least a portion of the connectors 104 are exposed external to the material 602 of the encased PCB 102. The two PCBs 102 shown in FIG. 9 may be configured for attaching to different components 806, respectively. Only one of the PCBs 102 is in use at one time. In other words, a first component 806 may be removably attached into a first cavity 804 and connected to one of the PCBs 102 which in turn is connected to a second component 806 which is removably attached in a second cavity 804. The second PCB 102, which connects the first and second cavity 804 is not in use.

When a component 806 is removably attached in a cavity of the housing 802, it can later be removed by pulling the component 806 away from the housing 802 (e.g. to overcome the friction fit).

The PCB 102 is molded into the housing 802 so that two components 806 can be electronically connected whilst being held (or removably attached) into the housing 802. The PCB 102 thereby allows different components 806 to adapt so that they be used with each other while being attached in the housing 802.

PCB 102 Removable from Housing 802

Figure 10:
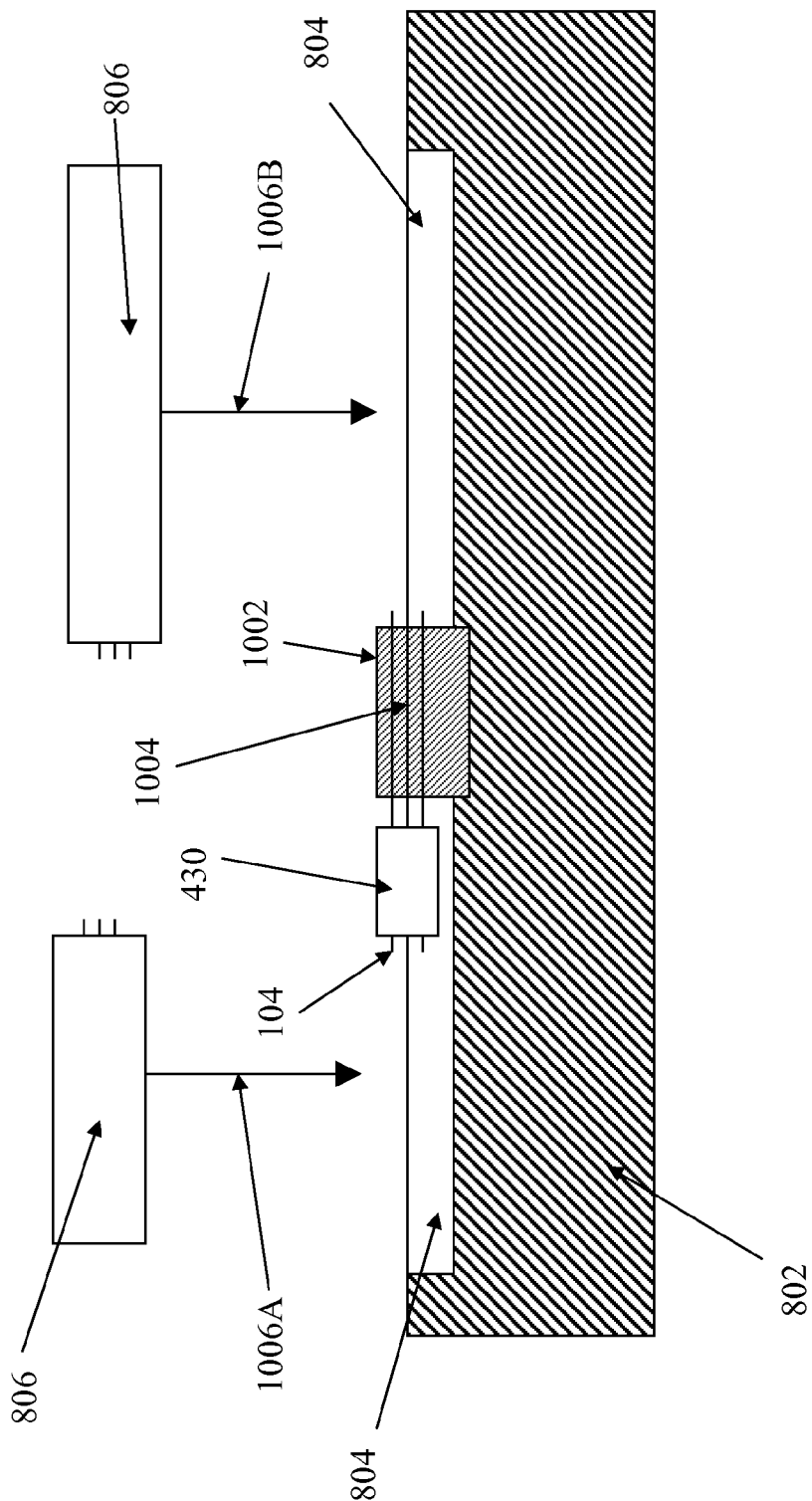
FIG. 10 is a cut out side elevation view of a housing with a removable printed circuit board and two removable components.
Figure 10A:
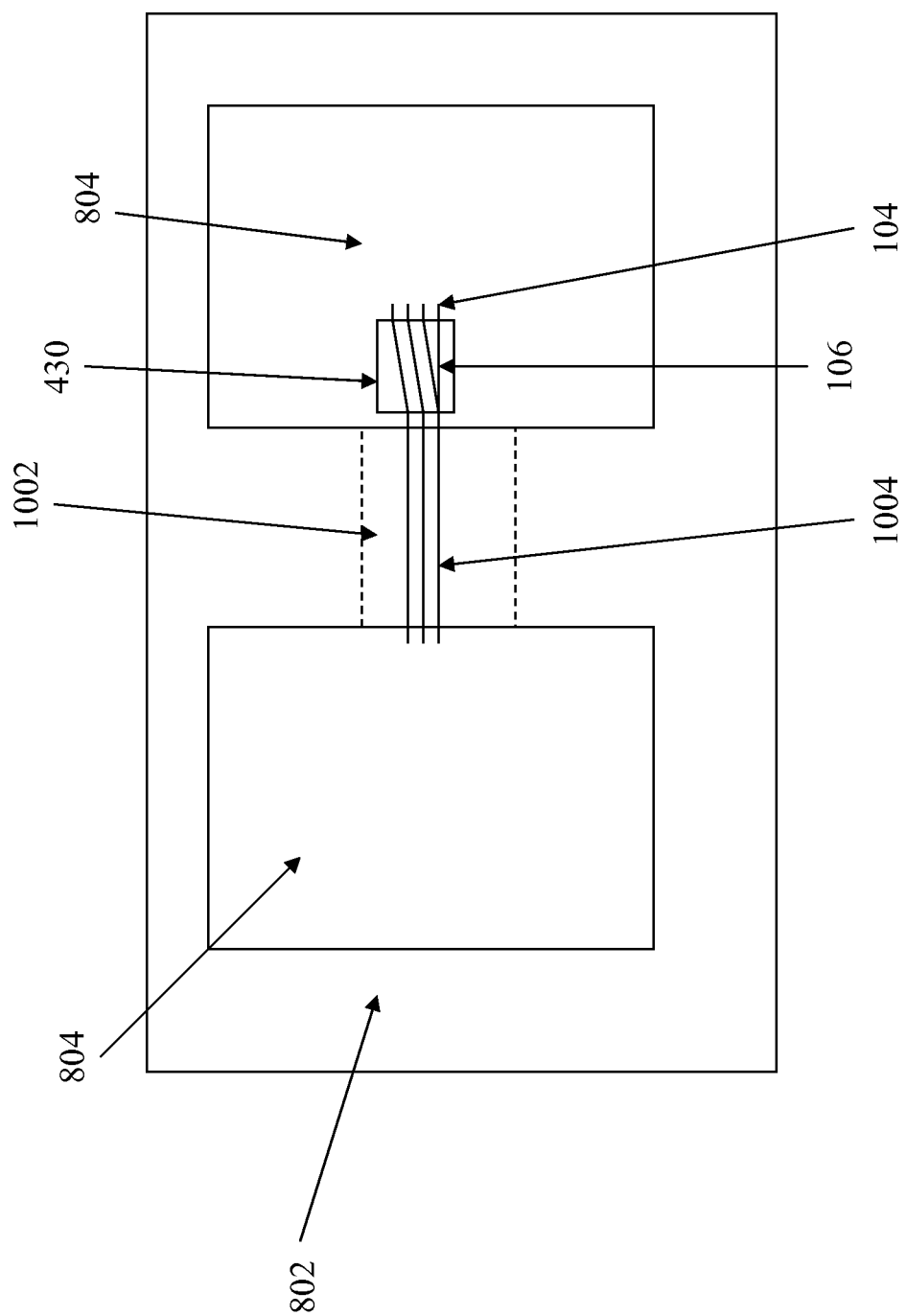
FIG. 10A is a top plan view of a housing holding a removable molded printed circuit board; and, FIG. 11 is a flow chart depicting the method of manufacturing the molded printed circuit board.

A further embodiment of the present invention is shown in FIGS. 10 and 10A. In this embodiment, the molded PCB 430 is a separate component that can be removably attached to the housing 802. A further component 806 may be removably attached in the cavity 804 of the housing and may be electronically attached to the molded PCB 600, which itself is attached to the housing 802. The PCB 600 can be used for adapting the housing 802 to fit additional or other components 806.

The housing 802 may have a receptacle 1002 between the two cavities 804. The receptacle 1002 may have wires 1004 or other electronically conductive material passing therethrough so as to allow electrical power to pass between components 806 which are connected by the receptacle 1002. The wires 1004 may have contacts (not shown) on their ends. The leads 104 (or contacts on the leads 110) of a PCT 102, molded PCB 430 or other component 806 may connect to the contacts of the wires 1004.

A molded PCB 430 may be removably attached in one of the cavities 804. The removable attachment of the molded PCB 430 may be a snap fit, friction fit or other attachment means known to a person of skill in the art. With the molded PCB 430 is secured in the cavity 804 to the housing 802, a component 806 can then be removably attached into the cavity 804 as shown by the arrow 1006A in FIG. 10. Alternatively, the component 806 can be attached in the cavity 804 and then the molded PCB 430 can be attached to the component 806 and receptacle 1002 in the cavity 804. By way of further alternative, the component 806 can be attached to the molded PCB 430 and then they can both be simultaneously secured in the cavity 804.

The wires 1004 in the receptacle 1002 can connect the cavity 804 that removably holds the molded PCB 430 with cavity 804 that may only hold a component 806, shown by the arrow 1006B. The wires 1004 in the receptacle 1002 electrically connect the components 806 and/or molded PCB 430 removably attached to one cavity 804 to the components 806 and/or molded PCB 430 removably attached to another cavity 804.

It is recognized that there may be more than two cavities 804 and more than one connecter 1002. Each receptacle 1002 may electronically connect two (or more) cavities 804.

The traces 106 in the molded PCB 430 may be routed (e.g. one-to-many, many-to-one).

The removably attachable molded PCB 430 thus connects different components 806 to each other while the components 806 are removably attached to the housing. Further, the PCB 430 allows different components 806 to adapt so that they can be used together.

Method of Manufacturing the Molded PCB 430

FIG. 11 is a flowchart 1100 depicting a method of manufacturing the molded PCB 600. First, at step 1102 a PCB 102 is provided in a mold 402. The PCB 102 has an exterior surface 108 with a plurality of connectors 104 thereon. Each connector 104 on the exterior surface 108 has an electrical contact. The connector 104 is for connecting the PCB 102 to an external electrical component 600,601.

At step 1104, a resilient material 602 is molded in the mold 402 onto the PCB 102. The resilient material 602 may be polymer or other plastics, for example. The resilient material portion defines apertures around the electrical contacts 104 for allowing access to the electrical contacts 104 from the exterior of the resilient material portion 602.

An adhesive (not shown) may be sprayed or otherwise placed onto the surface of the PCB 102 prior to molding the resilient material 602 onto it. When the resilient material 602 is molded onto the adhesive on the PCB 102, the resilient material 602 will bond thereto. Alternatively, a chemical or mechanical bond may be used to adhere the resilient material 602 to the PCB 102. Alternatively, the overmold material 602 bonds to the substrate 101 under heat and compression.

One or more currently preferred embodiments have been described by way of example. It will be apparent to persons skilled in the art that a number of variations and modifications can be made without departing from the scope of the invention as defined in the claims. Further, an additional optional step in the process also consists of 2 more steps: apply epoxy in the process openings left by pins 405 that support the PCB 102 during injection molding, and then after epoxy cures/solidifies, remove extra epoxy by machining to get flat surface on the overmolded connector 430.

What is claimed is the following:

1. A molded connector for connecting a first electronic component to a second electronic component, comprising:
    a printed circuit board having a plurality of traces such that first ends of the traces are electrically connected to a first connector and second ends of the traces are electronically connected to a second connector, the first connector configured for coupling to the first electronic component, the second connector configured for coupling to the second electronic component; and
    a molded material forming a housing defining a first cavity for receiving the first electronic component and a second cavity for receiving the second electronic component, the first and second cavities separated by the printed circuit board, the molded material molded onto the printed circuit board so as to entirely encase the printed circuit board for inhibiting exposure of the printed circuit board to contaminants and exposing (i) the first connector extending from a side of the first cavity and (ii) the second connector extending from a side of the second cavity for facilitating their respective coupling to the first and second electronic components, wherein the side of the first cavity is opposite the side of the second cavity and the first connector extends from the side of the first cavity in a direction opposite from a direction in which the second connector extends from the side of the second cavity.

2. The molded connector of claim 1, wherein the material is permanently applied around the printed circuit board.

3. The molded connector of claim 1, wherein the molded material forms a single molded piece of material encasing the printed circuit board and at least a portion of each of the connectors.

4. The molded connector of claim 1, wherein the molded material is removable from the printed circuit board only by damaging the material integrity of the molded material.

5. The molded connector of claim 1, the material circumnavigating the connectors so as to form a seal between the printed circuit board and a component connected thereto.

6. The molded connector of claim 5, the plurality of traces defining one-to-many routing coupling one contact of the first connector and multiple contacts of the second connector.

7. The molded connector of claim 5, the plurality of traces defining many-to-one routing coupling multiple contacts of the first connector and one contact of the second connector.

8. The molded connector of claim 5, the plurality of traces defining a many-to-many routing coupling multiple contacts of the first connector and multiple contacts of the second connector.

9. The molded connector of claim 1, wherein a connection between the first component and the first connector is a removable connection.

10. The molded connector of claim 1, wherein a connection between the second component and the second connector is a removable connection.

11. The molded connector of claim 3, wherein the material is resilient material overmolded onto the printed circuit board.

12. The molded connector of claim 4, wherein the material is hard plastic material.

13. The molded connector of claim 1, wherein the first connector of the printed circuit board is connected to a receiver of a docking station.

14. The molded connector of claim 1, the printed circuit board having a plurality of connectors for removably connecting to external components.

15. The molded connector of claim 6, wherein the first connector and the second connector are pogo pins.

16. The molded connector of claim 8, wherein the first connector and the second connector are pogo pin connectors.

17. The molded connector of claim 8, wherein the first connector is a pin and the second connector is a socket.

18. A housing for housing components of a mobile device, comprising:
    at least two cavities for receiving a respective first electrical component and a second electrical component;
    a printed circuit board having a plurality of traces such that first ends of the traces are electrically connected to a first connector and second ends of the traces are electrically connected to a second connector, the first connector configured for coupling to the first electrical component, the second connector configured for coupling to the second electrical component; and
    a molded material forming the housing, the molded material molded onto the printed circuit board so as to entirely encase the printed circuit board and separate the at least two cavities for inhibiting exposure of the printed circuit board to contaminants and exposing (i) the first connector extending from a side of a first of the at least two cavities and (ii) the second connector extending from a side of a second of the at least two cavities for facilitating their respective coupling to the first and second electrical components, wherein the side of the first cavity is opposite the side of the second cavity and the first connector extends from the side of the first cavity in a direction opposite from a direction in which the second connector extends from the side of the second cavity.

\* \* \* \* \*